Dec. 6, 1966   E. J. KELLY   3,289,307
DISTANCE GAUGE
Filed April 22, 1964
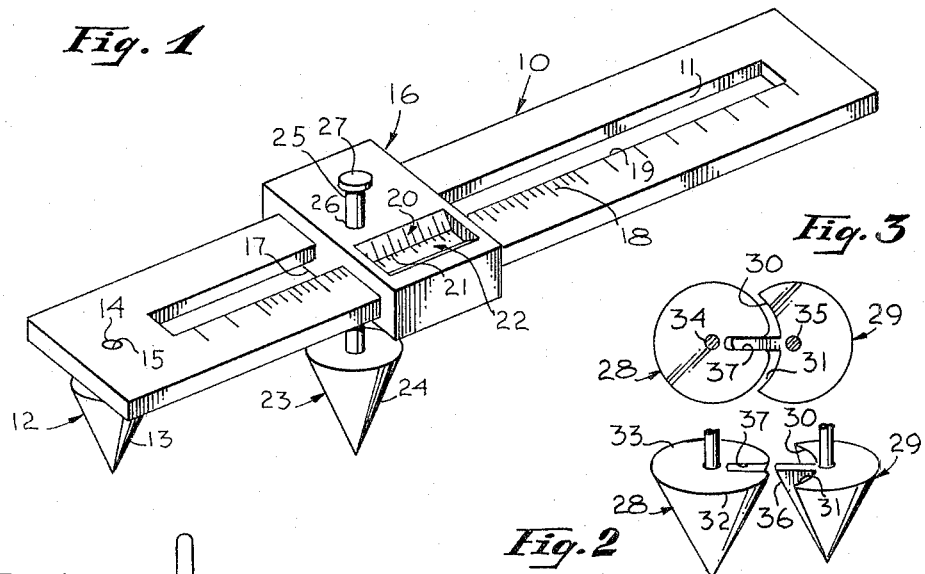
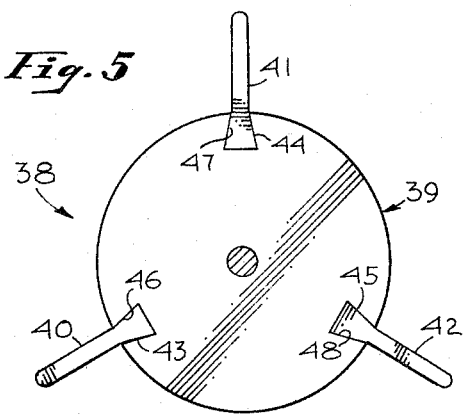
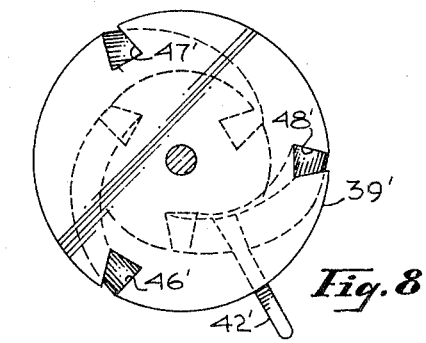
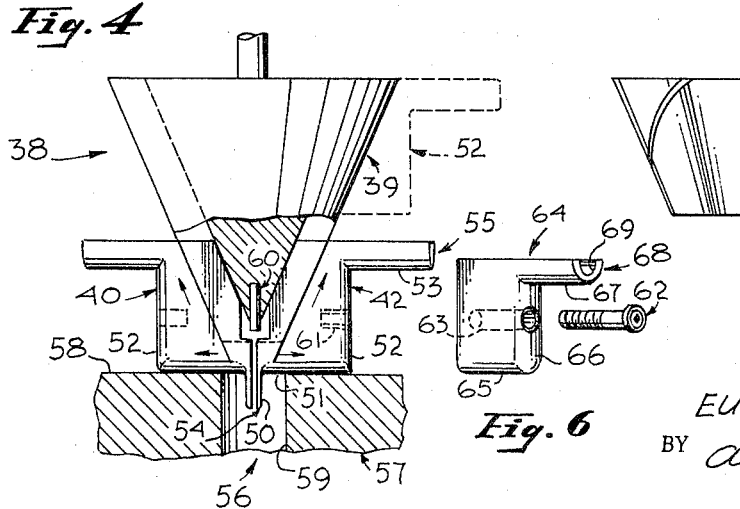
INVENTOR.
EUGENE J. KELLY
BY Allan M. Shapiro
ATTORNEY

United States Patent Office 3,289,307
Patented Dec. 6, 1966

3,289,307
DISTANCE GAUGE
Eugene J. Kelly, Los Angeles, Calif.
(P.O. Box 8111, Universal City, Calif.)
Filed Apr. 22, 1964, Ser. No. 361,700
5 Claims. (Cl. 33—143)

The present invention relates to a distance gauge and, more particularly, to a gauge for measuring the distance between the centers of two parallel holes.

Although there have been several hole centers distance gauges in the prior art, they have suffered from several disadvantages. For example, such gauges have been difficult to read conveniently because the measurement indicator has been located in effectively the same vertical plane as the hole finders, thus necessitating reading from the side. Side reading is awkward and relatively inaccurate because of common obstructions on the workpiece and the need to sight over the workpiece. Even more importantly, the prior gauges have been provided with hole center finders which may become positively seated within the holes even though the finders are tilted, i.e., not in vertical alignment with the holes, thus causing an error in measurement of the distance between the centers of the holes. Therefore, one of the objects of the present invention is the provision of a hole centers distance gauge which is highly accurate and can be rapidly read.

Another object of the present invention is the provision of a distance gauge with hole center finders which can be rapidly and easily inserted into the holes.

A further object of the present invention is to provide a hole centers distance gauge with hole center finders which automatically achieve a coaxial relationship with the holes to avoid errors in measurement otherwise due to tilting of the finders within the holes.

According to the present invention, a hole centers distance gauge having a longitudinal beam with a longitudinal slot therethrough is provided with measurement indicator means residing in a generally horizontal attitude in use so that visual readings can be obtained by looking downward. In one embodiment, an indicator member is slidably mounted on the longitudinal beam for movement along the effective length thereof and bears a vernier scale located adjacent a linear scale disposed on the upper surface of the beam whereby the usual vernier readings may be obtained for determining the distance of the indicator member from one end of the linear scale. A longitudinally immovable hole center finder is rigidly mounted to one end of the beam on the bottom surface thereof and having its central axis disposed at right angles to such surface. A longitudinally movable hole center finder is slidably mounted to the indicator member with its central axis parallel to the central axis of the immovable finder. The slidable movement of the movable finder with respect to the indicator member is in the vertical direction along the axis of the finder to allow for disparity in vertical positions of the primary functional portions of the two finders when located in holes having differing diameters and/or vertical locations, whereby the longitudinal member can be maintained in a position generally at right angles to the axes of the holes to prevent any initial inaccuracies of measurement due to tilting of the longitudinal member with respect to the hole axes. The finders in accordance with the present invention each comprise generally a conical member having a configuration and/or moving parts which cause the finder to automatically seat itself with respect to the hole in a manner such that the central axis of the finder is in vertical alignment with the central axis of the hole, all of which will be described more fully hereinafter. Generally, however, a preferred embodiment of the finder in accordance with the present invention comprises a conical member having a plurality of spaced tracks therein, each of such tracks coursing from the downwardly directed apex of the cone to the upwardly directed base of the cone, and a corresponding plurality of stepped locator members slidably mounted to respective ones of such tracks for movement therealong, each of such stepped locator members having a plurality of alternately vertical and horizontal surfaces, each of such vertical surfaces being adapted to be located within the hole and in abutment against the side of the hole, and each of such horizontal surfaces being adapted to rest upon the horizontal surface of the workpiece surrounding the hole. Additional embodiments and/or variations of the present invention include features relating to variations in the basic cones, tracks, locator members, and so forth.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a perspective view of a distance gauge in accordance with the present invention, showing one form of finders;

FIGURE 2 is a fragmentary perspective view showing a pair of finders of still another form;

FIGURE 3 is a top plan view of the finders illustrated in FIGURE 2, but moved so as to be in interengaged relationship;

FIGURE 4 is an enlarged fragmentary elevation view, partly in section, of a preferred embodiment of a finder in accordance with the present invention;

FIGURE 5 is a top plan view of the finder illustrated in FIGURE 4;

FIGURE 6 is a perspective view of an attachment for use with the finder illustrated in FIGURE 4;

FIGURE 7 is an enlarged fragmentary elevation view of another embodiment of a finder in accordance with the present invention; and FIGURE 8 is a top plan view of the finder illustrated in FIGURE 7.

Referring to FIGURE 1 of the drawings, there is seen a longitudinal beam 10 having a longitudinal slot 11 along substantially the entire length thereof. An immovable finder 12 is located at one end of the beam 10 in preferably central alignment with the slot 11 and has a cone portion 13 provided with a central pin 14, the latter being press-fit into a hole 15 in the beam 10. An indicator member 16 is slidably mounted on the beam 10 for freely slidable movement along the effective length thereof, such longitudinal movement being limited only by contact of the central portion 17 of the indicator member 16 with the beam portions at the ends of the slot 11. The upper surface of the beam 10 is provided with a linear scale 18 adjacent one edge 19 of the slot 11. A vernier scale 20 is located on a beveled edge 21 which forms one edge of a window 22 through the indicator member 16. A movable finder 23 comprises a cone portion 24 having a vertical pin 25 extending centrally upward therefrom, the pin 25 being slidable received through a hole 26 in the indicator member 16. The central axes of the cones 13 and 24 reside in a vertical plane parallel to the longitudinal edges of the slot 11 and the linear scale 18 and at right angles to the upper and lower planar surfaces of the beam 10. A retainer cap 27 is threaded into the end of the pin 25 and has a larger diameter than such pin to prevent the pin from dropping through the hole 26.

In use, the gauge illustrated in FIGURE 1 is placed so that the cone 13 of the immovable finder 12 is inserted as far as it will go into a hole in a workpiece, and then the indicator member 16 is slid along the beam 10 until the finder 23 is in approximate alignment with another workpiece hole, whereupon the cone 24 of the finder 23 is inserted into such second hole as far a sit will go, the operator simultaneously adjusting the indicator member 16 with respect to the beam 10 until the penetration of the cone 24 into the hole is smooth and complete, within the limitations of manual accuracy. The pin 25 will slide automatically in a vertical direction such that the central axes of the cones 13 and 24 will be in vertical alignment with the central axes of their respective holes, thus compensating for differences in sizes and vertical locations of the holes, since such position of axial alignments is the least-force position manually attainable. In such position, the beam 10 is located at right angles to the central axes of both of the holes, thus obtaining the most accurate measurement of the distance between the hole centers, with the scales 18 and 20 disposed effectively horizontally for ease of visual reading of the measurement.

Referring to FIGURES 2 and 3, there is seen a pair of finders 28 and 29 of generally conical shape, either one of which may be the immovable finder with the other one being the movable finder. The finder 29 is arcuately recessed at 30 and 31 with a horizontal radius of curvature equal to the radius of curvature of the edge 32 of the flat surface 33 of the other finder 28, such edge 32 exhibiting the largest radius of curvature of any portion of the finder 28 so that the finders 28 and 29 may be nested together, in the manner illustrated in FIGURE 3, with their respective center pins 34 and 35 as close together as possible, thereby permitting the measurement of center hole distances that are closer together than otherwise possible to measure. The arcuate recesses 30 and 31 may be joined together so as to be continuous. However, in the form illustrated, an integral portion 36 of the finder 29 remains between the recesses 30 and 31 for the purpose of providing an effectively continuous conical surface about the finder 29. In the form illustrated, the finder 28 is provided with a slotted recess 37 for receiving the radial portion 36 when the finders are juxtaposed for short distance measurement, as seen in FIGURE 3.

Referring to FIGURES 4 and 5, there is seen a finder, indicated generally at 38, which comprises a cone portion 39 and a plurality of locator members, shown as being three members 40, 41 and 42 equally spaced circumferentially about the cone 39. The locator members 40–42 are slidably mounted on the sides of the cone 39 for upward and downward movement with respect to the cone 39, each of the locator members 40–42 being slidably movable within a respective plane radial to the cone 39 and parallel to the conical taper. In the preferred embodiment illustrated, the slidable mounting is accomplished by a track-like arrangement wherein the locator members 40–42 are provided with respective tongue portions 43, 44 and 45, and the cone 39 is provided with corresponding grooves 46, 47 and 48 which slidably receive and laterally retain the corresponding tongue portions. The locator members 40–42 being identical to each other, the outer configuration of only the locator member 42 will now be described in further detail.

The locator member 42 is substantially a flat body which has a stepped outer surface configuration. The term "outer" is used herein relative to the cone 39 and refers to the radially outermost portion of the locator member with respect to the cone 39. Thus, viewing the outer surface configuration of the locator member 42 in sequence, the locator member 42 is seen to have an outer surface comprising a vertical portion 50, a horizontal portion 51, a vertical portion 52, and a horizontal portion 53, all such surface portions being successively further outwardly or upwardly from each other in the sequence given. In another sense, the first vertical surface portion 50 is defined by a vertically downward projection portion 54, and the second horizontal surface portion 53 is defined by a horizontally outward projection portion 55. Preferably, all of the outer surface portions 50–53 are rounded, it being particularly advantageous for the vertical surface portions 50 and 52 to be rounded or radiused to permit only single-line contact between such vertical surfaces and the sides of the hole in the workpiece.

In use, the finder 38 is positioned above the hole 56 in a workpiece so that the locator members 40–42 are inserted into the hole 56 to the fullest extent possible. With a hole the size illustrated, only the downward projections 54 can fit therewithin, the circumferential distance about the vertical surface portions 50 of all three locator members 40–42 being less than the circumference of the hole 56, but the minimum circumferential distance about the second vertical surface portions 52 of all three locator members 40–42 being greater than such hole circumference. Thus, the first horizontal surface portions 52 will rest upon the workpiece upper surface 58. By the application of only the slightest downward force upon the finder 38, such force being effectively accomplished by the mere weight of the gauge itself, the cone 39 progresses downwardly between the locator members 40–42 or, in the converse sense, the locator members 40–42 slide upwardly upon the cone 39, until all of the three first vertical surface portions 50 of the locator members 40–42 are in equal-force lateral abutment against the side 59 of the hole 56, with the first horizontal surface portions 51 resting upon the upper surface 58 of the workpiece 57. It now should be clear that the cone 39 is in vertical alignment with the hole 56 so that their vertical centers are coaxial, thus assuring accuracy of measurement of the hole centers distance.

For holes having circumferences larger than the minimum circumferential distance about the second vertical surface portions 52, the second horizontal surface portions 53 will rest upon the workpiece and the locators 40–42 will slide upwardly along the taper of the cone 39 until the second vertical surface portions 52 abut against the hole's side in the same manner as previously described.

Referring to FIGURE 6 in conjunction with FIGURE 4, there is seen an attachment for use with each of the locator members for extending their application to larger hole sizes. The locator member 42, for example, is provided with an internally threaded hole 61 for receiving a threaded bolt 62 which passes through a countersunk hole 63 in the attachment 64. The attachment 64 has a first horizontal outer surface portion 65 which provides a continuous surface with the first horizontal surface portion 51 of the main locator body, and is also provided with respective vertical and horizontal surface portions 66 and 67 which replace respective surfaces 52 and 53 in function. The horizontally projecting portion 68 is provided with a concave upper surface 69 which mates with the previously-available outer surface 53. The attachment 64 is adapted for use with holes that are so large that the limited upward movement of the locator (as indicated generally in dash lines in FIGURE 4) otherwise could not accommodate the hole in that the vertical surface portions 52 would not abut against the side of the hole.

Referring to FIGURES 7 and 8, there is seen a modified embodiment of the finder illustrated in FIGURES 4–6, all of the elements being either the same or similar and bearing the same reference numerals primed. Instead of the vertical movement of the locator members with respect to the cone 39' being in radial planes, the grooves 46'–48' are arranged for spiral movement of the locator members, such as member 42', thus obtaining greater accuracy in some instances because of the finer vertical resolution resulting from the longer track distance for the extent of vertical movement obtained. Of course, the large hole attachment illustrated in FIGURE 6 is equally applicable to the locator members of the spiral-movement embodiment illustrated in FIGURES 7 and 8.

It should be understood that the recess arrangement illustrated in FIGURES 2 and 3 can be applied to cones of the type illustrated in FIGURES 4 and 5 for the same purpose as previously described.

It should also be understood that the vernier method of measurement illustrated in FIGURE 1 is exemplary only, and that other measurement indicators well known in the art may be used such as, for example, dial indicators and micrometer gauges.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A hole centers distance gauge for measuring the distance between the centers of parallel circular holes in a workpiece, comprising:
    a longitudinal beam member bearing a scale;
    indicator means slidably mounted on said beam member for movement along the effective length thereof and having means for registration with said scale;
    first hole center finder means mounted on one end of said beam member and having a first central vertical axis disposed at right angles to said beam member;
    second hole center finder means mounted on said indicator means for longitudinal movement therewith and having a second central vertical axis parallel to said first central axis;
    each of said finder means comprising a conical member; and
    locator means mounted on at least one of said conical members in slidably retained relationship and comprising a plurality of equally circumferentially spaced members having alternating vertical and horizontal external surfaces.

2. A gauge in accordance with claim 1 wherein said locator means members are each movable parallel to the conical taper of such conical member and within a respective plane radial to such conical member.

3. A gauge in accordance with claim 2 comprising a plurality of extension members having additional alternating vertical and horizontal external surfaces and being removably attachable to said locator means members for application to larger hole sizes.

4. A gauge in accordance with claim 1 wherein said locator means members are each movable spirally about said conical member.

5. A gauge in accordance with claim 4 comprising a plurality of extension members having additional alternating vertical and horizontal external surfaces and being removably attachable to said locator means members for application to larger hole sizes.

References Cited by the Examiner

UNITED STATES PATENTS

| | | | |
|---|---|---|---|
| 2,537,473 | 1/1951 | McCusker | 33—158 |
| 2,677,186 | 5/1954 | Sorensen | 33—143 |
| 2,693,033 | 11/1954 | Acker et al. | 33—158 |

LEONARD FORMAN, *Primary Examiner.*

HARRY N. HAROIAN, *Assistant Examiner.*